(12) United States Patent
Puchianu et al.

(10) Patent No.: US 10,009,066 B2
(45) Date of Patent: Jun. 26, 2018

(54) TRANSMITTING ELECTRICAL POWER AND DATA

(71) Applicant: GE OIL & GAS UK LIMITED, Bristol (GB)

(72) Inventors: Silviu Puchianu, Bristol (GB); Graham Thomas Morley, Bristol (GB); Richard Julian Davis, Bristol (GB)

(73) Assignee: Vetco Gray Controls Limited, Bristol (GB)

( * ) Notice: Subject to any disclaimer, the term of this patent is extended or adjusted under 35 U.S.C. 154(b) by 0 days. days.

(21) Appl. No.: 15/022,979

(22) PCT Filed: Sep. 18, 2014

(86) PCT No.: PCT/GB2014/052835
§ 371 (c)(1),
(2) Date: Mar. 18, 2016

(87) PCT Pub. No.: WO2015/040400
PCT Pub. Date: Mar. 26, 2015

(65) Prior Publication Data
US 2016/0233924 A1   Aug. 11, 2016

(30) Foreign Application Priority Data

Sep. 19, 2013   (GB) .................................. 1316648.3

(51) Int. Cl.
*H04B 13/02* (2006.01)
*H04B 3/54* (2006.01)
*H04L 25/49* (2006.01)

(52) U.S. Cl.
CPC ............ *H04B 3/548* (2013.01); *H04B 13/02* (2013.01); *H04L 25/4902* (2013.01); *H04B 2203/5475* (2013.01)

(58) Field of Classification Search
CPC .................... H04B 3/548; H04B 13/02; H04B 2203/5475; H04L 25/4902
(Continued)

(56) References Cited

U.S. PATENT DOCUMENTS 4,398,178 A     8/1983  Russ et al.
9,049,014 B2 *  6/2015  Kristiansen ......... E21B 33/0355
(Continued)

FOREIGN PATENT DOCUMENTS

EP     0463341 A1    1/1992
EP     2104240 A1    9/2009
(Continued)

OTHER PUBLICATIONS

Great Britain Search Report dated Mar. 4, 2014 which was issued in connection with GB Patent Application No. 1316648.3 which was filed on Sep. 19, 2013.

(Continued)

*Primary Examiner* — Dhaval Patel
(74) *Attorney, Agent, or Firm* — GE Global Patent Operation

(57) ABSTRACT

A communication system for transmitting electrical power and data between a first end of a transmission line and a second end of the transmission line comprises, at the first end: a DC supply means for supplying direct current to the transmission line; first switching means for switching the DC supply means; and a first modulator for operating the first switching means. At the second end, the system comprises an energy storage means for storing and supplying DC power; second switching means for switching power from the energy storage means; and a second modulator for operating the second switching means.

20 Claims, 4 Drawing Sheets

(58) Field of Classification Search
USPC ...... 340/850, 12.85, 538.12, 932.2; 370/278, 370/294; 375/259, 260, 238, 239, 278
See application file for complete search history.

(56) References Cited

U.S. PATENT DOCUMENTS

| | | | |
|---|---|---|---|
| 2005/0030165 A1* | 2/2005 | Bateman | H04B 3/548 370/294 |
| 2006/0038661 A1 | 2/2006 | Reinhold et al. | |
| 2006/0079971 A1 | 4/2006 | Billo | |
| 2011/0222595 A1* | 9/2011 | Choi | H04B 3/548 375/238 |

FOREIGN PATENT DOCUMENTS

| | | | | |
|---|---|---|---|---|
| EP | 2602941 A1 | 6/2013 | | |
| EP | 2620585 A1 | 7/2013 | | |
| EP | 2621113 A1 | 7/2013 | | |
| EP | 2645587 | 10/2013 | | |
| GB | 2335334 A | * | 9/1999 | ......... H02J 13/0051 |
| GB | 2352376 A | 1/2001 | | |
| GB | 2441811 A | 3/2008 | | |
| GB | 2484727 A | 4/2012 | | |
| JP | H07283765 A | 10/1995 | | |
| WO | 0046923 | 8/2000 | | |
| WO | 2004028064 A2 | 4/2004 | | |

OTHER PUBLICATIONS

International Search Report and Written Opinion dated Dec. 3, 2014 which was issued in connection with PCT Patent Application No. PCT/GB2014/052835 which was filed on Sep. 18, 2014.

* cited by examiner

TRANSMITTING ELECTRICAL POWER AND DATA

BACKGROUND

Embodiments of the present invention relate to transmitting electrical power and data, for example in a control system for an underwater (for example subsea) hydrocarbon well facility.

For transmitting electrical power and data, communication on power (COP) systems are known where an analogue data waveform modulates a power waveform at one end and, at another other end, power and data filters are used to separate the power waveform from the data waveform.

For long offset power and data transmission systems (for example tens or hundreds of miles), this method allows for bi-directional transmission of power and data on the same copper wires.

These systems are widely used in control systems for subsea hydrocarbon well facilities.

A known system is illustrated in FIG. 1 and uses hardware analogue filters. These filters are not accurate, they are space intensive and they introduce distortions, noise and power losses. Furthermore, transients on the power source can corrupt the data transmission. More particularly, at a topside end of a long COP line 1 electrical power is supplied by a transformer 2 and a power filter 3 to a combiner 4 where data from a modem 5 and a data filter 6 is combined with the power waveform for transmission via line 1. Also, data received from subsea can be extracted from line 1 via the filter 6 and the modem 5. At the other, subsea end of line 1, electrical power is extracted from a combiner 7 via a power filter 8 and a transformer 9 and data is extracted via a data filter 10 and a modem 11. Also, data can be sent to the topside end via modem 11 and filter 10 for extraction from combiner 4.

As prior art, there may be mentioned U.S. Pat. No. 4,398,178, WO 00/46923, EP-A-2 104 240, GB-A-2 441 811, WO 2004/028064, EP-A-0 463 341, US 2006/079971 and GB-A-2 352 376.

As further prior art, there may be mentioned EP-A-2 620 585 and EP-A-2 621 113 which disclose prior art communication and power systems. EP-A-2 602 941 discloses a time division multiplexed communication on power system. Additionally, unpublished European Patent Application No. 12162210.4 discloses a further communication on power system based on DC data signal modulation.

To overcome the drawbacks associated with such systems, embodiments of the present invention provide both electric power and communication in a control system of a subsea hydrocarbon well facility between topside equipment and subsea remote sensors using either pulse width modulation (PWM) or time division multiplexing (TDM) techniques, to simplify the line signalling and line arbitration methods so that the minimum required power may be delivered to a sensor and its associated communications transmitter.

SUMMARY OF THE INVENTION

According to the present invention from one aspect, there is provided a communication system for transmitting electrical power and data between a first end of a transmission line and a second end of the transmission line, the apparatus comprising, at the first end a DC supply means for supplying direct current to the transmission line; first switching means for switching the DC supply means; and a first modulator for operating the first switching means, and at the second end an energy storage means for storing and supplying DC power; second switching means for switching power from the energy storage means; and a second modulator for operating the second switching means, wherein the first modulator operates the first switching means to provide a communication on power signal from the first end of the transmission line to the second end of the transmission line; the second modulator operates the second switching means to provide communications from the second end of the transmission line to the first end of the transmission line; and communications from the second end of the transmission line to the first end of the transmission line are provided only when power from the first end of the transmission line to the second end of the transmission line is not being provided by the signal.

In accordance with a second aspect of the present invention there is provided a method of transmitting electrical power and data between a first end of a transmission line and a second end of the transmission line, the method comprising, at the first end supplying DC power to the transmission line; and switching the DC power using a first modulator, and at the second end storing DC power received from the transmission line; supplying DC power to the transmission line; and switching the DC power using a second modulator, wherein the first modulator switches the DC power at the first end to provide a communication on power signal from the first end of the transmission line to the second end of the transmission line; the second modulator switches the DC power at the second end to provide communications from the second end of the transmission line to the first end of the transmission line; and communications from the second end of the transmission line to the first end of the transmission line are provided only when power from the first end of the transmission line to the second end of the transmission line is not being provided by the signal.

The communication on power signal from the first end of the transmission line to the second end of the transmission line could be provided using an encoding technique. The encoding technique could be one of pulse width modulation, frequency modulation, binary phase shift keying, differential phase shift keying and non-return to zero encoding of an asynchronous serial data stream.

The communication on power signal from the first end of the transmission line to the second end of the transmission line could be provided using pulse width modulation with, for example with a pulse of 75% of the duty cycle being employed to encode a logic 1 and a pulse of 50% of the duty cycle being employed to encode a logic 0. Communication from the second end of the transmission line to the first end of the transmission line could be provided in a transmit window comprising a pulse-free part of the duty cycle.

Similarly, communication from the second end of the transmission line to the first end of the transmission line could use an encoding technique, which could be one of pulse width modulation, frequency modulation, binary phase shift keying, differential phase shift keying and non-return to zero encoding of an asynchronous serial data stream.

At least one of the first and second modulators could comprise a digital signal processor. At least one of the first and second modulators could comprise a field programmable gate array. At least one of the first and second modulators could comprise a micro-controller.

A control system for an underwater hydrocarbon well facility system could comprise a system according to embodiments of the present invention, wherein the first end is located topside and the second end is located subsea.

BRIEF DESCRIPTION OF THE DRAWINGS

Embodiments of the present invention will now be described, by way of example, with reference to the accompanying drawings, in which:

FIG. 2 shows a block diagram of a PWM embodiment of the invention operating in the mode of transmitting data from topside in a subsea hydrocarbon well facility and receiving the data at a subsea sensor, whilst simultaneously generating DC power for the sensor. This mode functions as follows.

DETAILED DESCRIPTION

Figure 1:
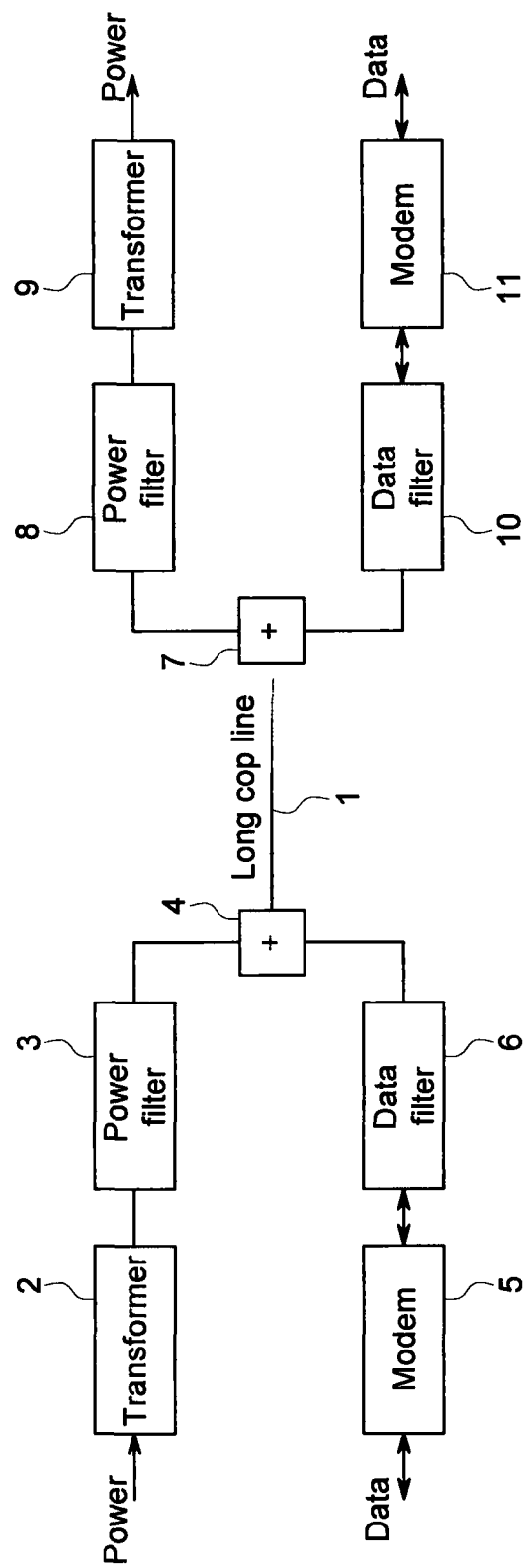
FIG. 1 schematically shows a prior art communication on power system.

A topside pulse width modulator 12 operates a switch 13 in response to a digital communications input from a topside transmitter 22. The switch 13 connects a topside DC supply 14 to a single wire conductor 23 in an umbilical cable, to transmit DC power from the supply 14, to a subsea sensor 17, via a rectifier and low pass filter 18 and a DC to DC converter and energy storage device 19.

Figure 4:
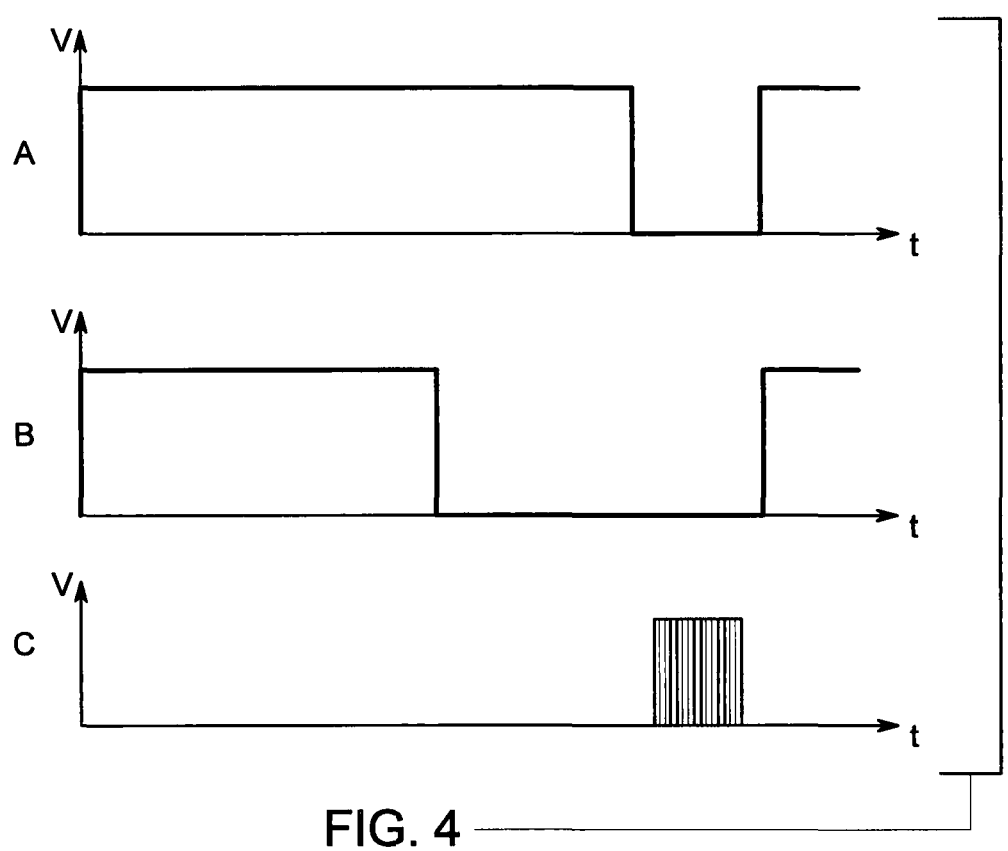
FIG. 4 shows typical graphs of voltages on a transmission line of the system of FIG. 2.

The duty cycle of the PWM is varied, so as to encrypt a communications message to be transmitted from topside to a subsea digital receiver pulse width demodulator 20, and thus to the sensor 17. (Graph A in FIG. 4 shows, as an example, a duty cycle of 75% [3:1 mark:space ratio] employed to encode a logic 1 and graph B in FIG. 4 shows a duty cycle of 50% [1:1 mark:space ratio] employed to encode a logic 0). Thus, both power and communications can be delivered to the subsea sensor 17 using a very simple switching method.

The PWM communication on power (COP) signal is synthesised using simple PWM switching of the topside DC supply 14. Power is delivered to the subsea sensor 17, during a PWM 'mark' and power is interrupted during a PWM 'space'.

The topside equipment listens for a subsea response during a PWM 'space'.

The PWM combined communication and power signal is routed (switched) within the subsea equipment through rectifier and low pass filter 18, to device 19, which provides a regulated supply and energy storage for the sensor 17, when the DC supply from topside is interrupted (during a PWM cycle 'space').

The sensor power demands, and operational modes, therefore synchronise with the topside COP signal PWM waveform.

At the same time as power is delivered to the energy storage and DC to DC converter device 19, subsea digital receiver demodulator 20 synchronises to the PWM waveform and decodes the transmitted message. A falling edge of the PWM signal initiates the PWM data transfer and is used to synchronise the subsea digital receiver demodulator 20 in readiness to receive the topside to subsea communications serial data transfer.

The ambient condition of the system, i.e. when not transmitting/communicating, is continuous DC power delivery from topside to subsea.

Figure 2:
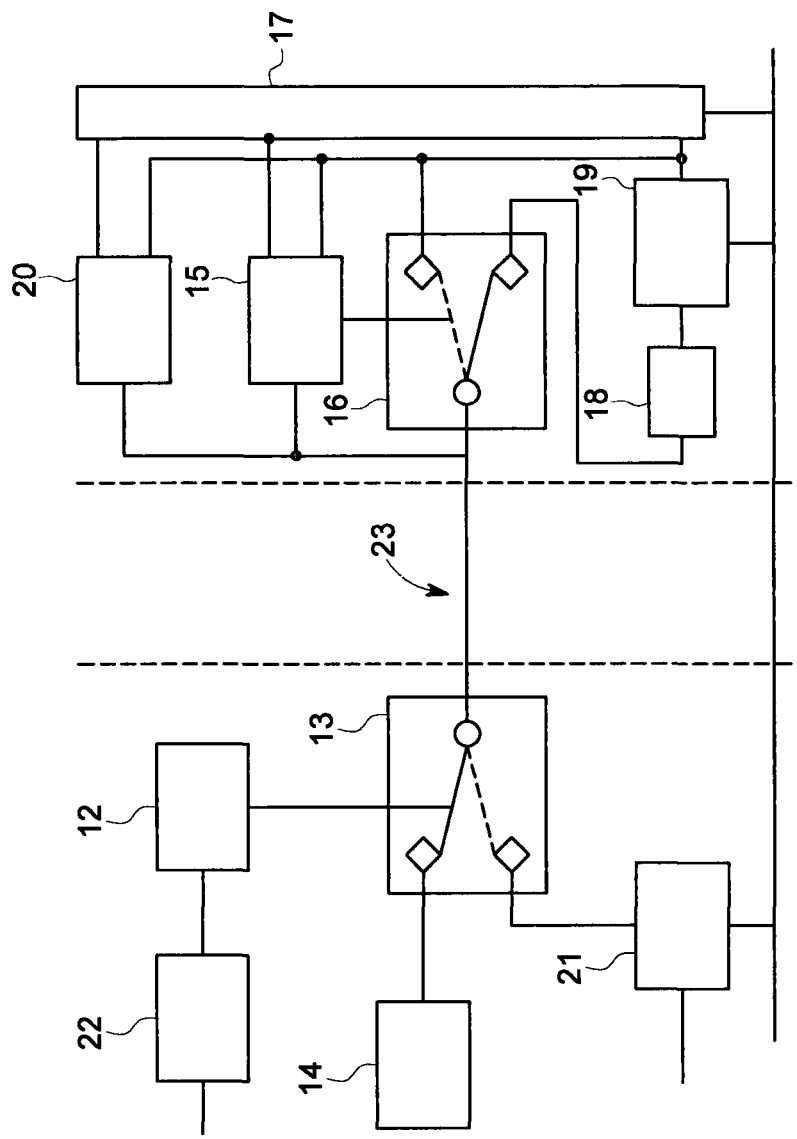
FIG. 2 schematically shows a system in accordance with an embodiment of the present invention in one mode of operation.
Figure 3:
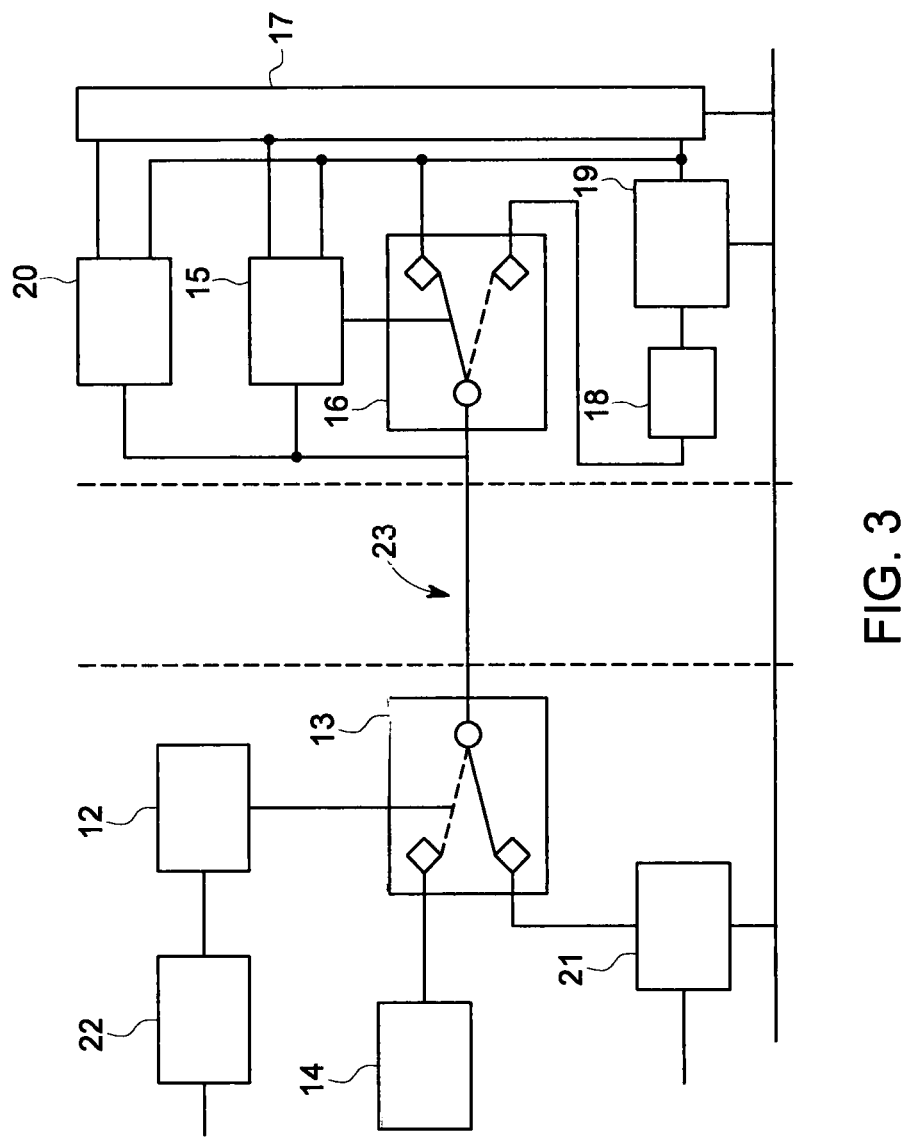
FIG. 3 schematically shows the system of FIG. 2 in another mode of operation.

FIG. 3 shows a block diagram of the PWM embodiment of FIG. 2 operating in the mode of transmitting data from the subsea sensor 17 and receiving the data topside. This mode functions as follows.

The subsea sensor 17 has a 'transmit window' in which to transmit a serial communications burst back to the topside equipment which is coincident with a PWM signal 'space' (see graph C in FIG. 4). During a PWM 'space' the topside equipment listens for a subsea transmission burst.

The subsea communications burst is synthesised using simple ON/OFF switching of the subsea sensor DC power supply from device 19 by a subsea modulator 15. Power is not delivered to the subsea sensor 17 from the topside DC power supply 14 during a PWM 'space'.

Subsea-to-topside communications can be transmitted using a range of simple encoding techniques, for example PWM (2 duty cycle PWM encoding), frequency modulation (2 tone FM square wave encoding), binary phase shift keying (BPSK), differential phase shift keying (DPSK) or the like, or simple non-return to zero (NRZ) encoding of an asynchronous serial data stream.

The topside equipment listens for a subsea response during a PWM 'space'.

The topside equipment looks for a rising edge on the line 23 during a 'sensor transmit window' which it uses to initiate the topside message receive cycle (by a topside receiver 21) and to synchronise the topside equipment to the subsea sensor 17, in readiness to receive the subsea-to-topside communications serial data transfer.

Once the receive data cycle has completed, the topside equipment returns to default DC power delivery mode A possible system protocol for the PWM embodiment is as follows:

The topside equipment always initiates communications.

The system is operated as a topside master/subsea slave system.

The system remains in a default operational mode with the topside equipment supplying DC power to the subsea sensor and performing no communications, to maximise power delivery to the sensor until the topside equipment is ready to interrogate the sensor for telemetry.

Data transfers from topside to subsea commence when the duty cycle of the topside power modulator changes from 100% power delivery to the designated logic 0 PWM duty cycle.

The change in the COP signal duty cycle and the COP voltage drop to 0V is detected by the subsea digital receiver demodulator 20 and used to synchronise it to the PWM waveform and the topside-to-subsea communications burst. The communications burst can thus be sampled and received by the subsea sensor 17.

Topside-to-subsea communications is low data rate (by comparison with the subsea-to-topside communications which constitutes the bulk of the communications traffic) and is readily supported by a low frequency PWM DC power waveform.

During a PWM burst, the subsea sensor 17 still receives power (if interrupted) from topside but employs local energy storage from device 19 (topped up during the periods when the PWM cycle is maintained at 100%) to assure continuity of its power source.

The PWM duty cycle (logic 0 PWM duty cycle and logic 1 PWM duty cycle) can be selected/designed for optimum power transfer during the PWM burst as required.

The subsea sensor 17, once synchronised to the PWM waveform, has an opportunity to transmit data from subsea to the topside receiver when the topside equipment is known to be listening (i.e. when the modulator 12 is in a 'space' state). Subsea-to-topside transmission is performed in a burst synchronised to the PWM waveform within a timed window. Thus, subsea-to-topside communications bursts are interleaved with the topside-to-subsea PWM bursts.

A further utilisation of embodiments of the present invention is to handle a multi-drop requirement, i.e. more than one sensor supported by a COP wire pair or single wire and can therefore be considered for down-hole pressure and temperature (DHPT) type systems where single wire systems (with casing return) are routinely used.

In such topologies, the topside master equipment will indicate which of several sensors is to respond by specifically addressing the target sensor in the PWM message as part of the topside-to-subsea messaging protocol. Once addressed, only the target sensor is to respond to messaging requests. Other multi-drop sensors must be specifically addressed to make them the target of subsequent telemetry acquisition(s)

It should be noted that for all PWM configurations, the topside equipment applies DC power to the subsea equipment for a predetermined period to enable the or each subsea sensor to establish its internal power source and charge up its internal energy storage device(s). Only after this precharge initialisation period can the PWM interrogation response cycles commence.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication system for transmitting electrical power and data between a first end of a transmission line and a second end of the transmission line, the system comprising, at the first end:
   a DC supply device for supplying direct current to the transmission line;
   a first switching device for switching the DC supply device; and
   a first modulator for operating the first switching device, and at the second end an energy storage device for storing and supplying DC power;
   a second switching device for switching power from the energy storage device; and
   a second modulator for operating the second switching device, wherein the first modulator operates the first switching device to provide a PWM (pulse width modulation) communication on power signal from the first end of the transmission line to the second end of the transmission line;
   the second modulator operates the second switching device to provide communications from the second end of the transmission line to the first end of the transmission line; and
   communications from the second end of the transmission line to the first end of the transmission line are provided only when a rising edge of a transmit window is detected indicating power from the first end of the transmission line to the second end of the transmission line is not being provided by the PWM communication on power signal,
   and wherein a falling edge of the PWM communication on power signal initiates a data transfer and synchronizes a demodulator in readiness to receive the data transfer.

2. The system according to claim 1, wherein the PWM communication on power signal from the first end of the transmission line to the second end of the transmission line is provided using an encoding technique.

3. The system according to claim 2, wherein the encoding technique is one of pulse width modulation, frequency modulation, binary phase shift keying, differential phase shift keying and nonreturn to zero encoding of an asynchronous serial data stream.

4. The system according to claim 1, wherein the PWM communication on power signal from the first end of the transmission line to the second end of the transmission line is provided using pulse width modulation.

5. The system according to claim 4, wherein a pulse of 75% of the duty cycle of the pulse width modulation is employed to encode a logic 1 and a pulse of 50% of the duty cycle is employed to encode a logic 0.

6. The system according to claim 4, wherein communications from the second end of the transmission line to the first end of the transmission line are provided in a transmit window comprising a pulse free part of the duty cycle of the pulse width modulation.

7. The system according to claim 1, wherein communications from the second end of the transmission line to the first end of the transmission line are transmitted using an encoding technique.

8. The system according to claim 7, wherein the encoding technique is one of pulse width modulation, frequency modulation, binary phase shift keying, differential phase shift keying and nonreturn to zero encoding of an asynchronous serial data stream.

9. A control system for an underwater hydrocarbon well facility system comprising a system according to claim 1, wherein the first end is located topside and the second end is located underwater.

10. A method of transmitting electrical power and data between a first end of a transmission line and a second end of the transmission line, the method comprising, at the first end:
   supplying DC power to the transmission line; and
   switching the DC power using a first modulator,
   and at the second end:
   storing DC power received from the transmission line;
   supplying DC power to the transmission line; and
   switching the DC power using a second modulator,
   wherein the first modulator switches the DC power at the first end to provide a PWM (pulse width modulation) communication on power signal from the first end of the transmission line to the second end of the transmission line;
   wherein the second modulator switches the DC power at the second end to provide communications from the second end of the transmission line to the first end of the transmission line; and
   communications from the second end of the transmission line to the first end of the transmission line are provided only when a rising edge of a transmit window is detected indicating power from the first end of the transmission line to the second end of the transmission line is not being provided by the PWM communication on power signal, and wherein a falling edge of the PWM communication on power signal initiates a data transfer and synchronizes a demodulator in readiness to receive the data transfer.

11. The method according to claim 10, wherein the PWM communication on power signal from the first end of the transmission line to the second end of the transmission line is provided using an encoding technique.

12. The method according to claim 11, wherein the encoding technique is one of pulse width modulation, frequency modulation, binary phase shift keying, differential phase shift keying and nonreturn to zero encoding of an asynchronous serial data stream.

13. The method according to claim 10, wherein the PWM communication on power signal from the first end of the transmission line to the second end of the transmission line is provided using pulse width modulation.

14. The method according to claim 13, wherein a pulse of 75% of the duty cycle of the pulse width modulation is employed to encode a logic 1 and a pulse of 50% of the duty cycle is employed to encode a logic 0.

15. The method according to claim 13, wherein communications from the second end of the transmission line to the first end of the transmission line are provided in a transmit window comprising a pulse free part of the duty cycle of the pulse width modulation.

16. The method according to claim 10, wherein communications from the second end of the transmission line to the first end of the transmission line are transmitted using an encoding technique.

17. The method according to claim 16, wherein the encoding technique is one of pulse width modulation, frequency modulation, binary phase shift keying, differential phase shift keying and nonreturn to zero encoding of an asynchronous serial data stream.

18. The method according to claim 10, performed in a control system for an underwater hydrocarbon well facility, the first end being topside and the second end being underwater.

19. The system according to claim 5, wherein communications from the second end of the transmission line to the first end of the transmission line are provided in a transmit window comprising a pulse free part of the duty cycle of the pulse width modulation.

20. The method according to claim 11, wherein the PWM communication on power signal from the first end of the transmission line to the second end of the transmission line is provided using pulse width modulation.

* * * * *